(12) United States Patent
Watt

(10) Patent No.: US 6,837,353 B2
(45) Date of Patent: Jan. 4, 2005

(54) PARALLEL SHIFT CLUTCH

(76) Inventor: Duane O. Watt, 29024 650th Ave., Litchfield, MN (US) 55355

( * ) Notice: Subject to any disclaimer, the term of this patent is extended or adjusted under 35 U.S.C. 154(b) by 0 days.

(21) Appl. No.: 10/446,983

(22) Filed: May 28, 2003

(65) Prior Publication Data

US 2004/0112705 A1 Jun. 17, 2004

Related U.S. Application Data

(63) Continuation-in-part of application No. 10/321,149, filed on Dec. 17, 2002.
(60) Provisional application No. 60/454,471, filed on Mar. 13, 2003.

(51) Int. Cl.[7] .............................................. F16H 53/08
(52) U.S. Cl. ..................... 192/54.52; 192/93 A; 474/21
(58) Field of Search ........................... 192/93 A, 54.52; 474/10, 21, 17, 19

(56) References Cited

U.S. PATENT DOCUMENTS

| | | | | |
|---|---|---|---|---|
| 3,368,416 A | * | 2/1968 | Mitchell ..................... 474/21 |
| 3,861,228 A | | 1/1975 | Adams | |
| 5,516,333 A | * | 5/1996 | Benson ....................... 474/19 |
| 5,538,120 A | * | 7/1996 | Berardicurti ............. 192/54.52 |
| 5,562,555 A | * | 10/1996 | Peterson ..................... 474/14 |
| 5,720,681 A | * | 2/1998 | Benson ....................... 474/10 |
| 5,967,286 A | * | 10/1999 | Hokanson et al. ...... 192/110 R |
| 6,095,937 A | * | 8/2000 | Aaen .......................... 474/10 |
| 6,120,399 A | | 9/2000 | Okeson et al. | |
| 6,146,295 A | | 11/2000 | Mor et al. | |
| 6,379,274 B1 | * | 4/2002 | Robert ........................ 474/19 |

* cited by examiner

Primary Examiner—Saul Rodriguez
(74) Attorney, Agent, or Firm—Kinney & Lange, P.A.

(57) ABSTRACT

A torque sensitive clutch has an outer and inner sheave and a means for attaching the outer and inner sheave to each other such that the spacing, between the outer and inner sheave expands and contracts without relative rotation. The clutch system is assembled in a manner wherein all rotating force from the outer and inner sheave is transmitted to the power shalt, because the V-belt residing between the outer and inner sheaves does not slip making the clutch much more efficient.

20 Claims, 7 Drawing Sheets

PARALLEL SHIFT CLUTCH

This is a continuation-in-part of U.S. application Ser. No. 10/321,149 filed Dec. 17, 2002 for PARALLEL SHIFT CLUTCH and claims priority from U.S. Provisional Application No. 60/454,471 filed Mar. 13, 2003 for PARALLEL SHIFT CLUTCH.

BACKGROUND OF THE INVENTION

The present invention relates generally to a clutch system. In particular, the present invention relates to a torque sensing clutch.

Variable speed belt drives are commonly used with internal combustion engines, and particularly with snowmobiles and all terrain vehicles. Such belt drives permit operation from low velocities to speeds exceeding 100 mph. The belt drive typically includes a driving clutch with a shaft that is coaxial with the output shaft of the vehicle's engine. The driving or primary clutch has a stationary and a fixed sheave that together define a pulley around which a V-belt may travel. The V-belt also travels around a driven or secondary clutch pulley that transfers the engine's power to the output shaft driving the vehicle.

The effective radius of both the primary and the secondary pulley may be varied. The ratio of the primary pulley radius to the secondary pulley radius determines the ratio of engine rotational speed to output shaft rate of rotation. When the primary clutch radius is small compared to the secondary clutch, the output shaft will turn at a rate that is slower than the engine speed resulting in a relatively low vehicle speed. As the ratio of the primary and secondary clutch radii approaches 1:1, the output shaft speed is approximately equal to the engine or crank shaft speed. Then, as the primary pulley radius becomes greater than the radius of the secondary clutch pulley, an overdrive condition exists in which the output shaft is turning at a greater rate than the engine crank shaft.

Ideally, an engine will deliver power in a linear manner, and all of the available engine power is delivered to the output shaft regardless of the vehicle's speed or load. Unfortunately, this is not the case with real world engines. A typical engine will instead deliver its maximum power over a narrow range of relatively high crankshaft speeds with power falling off measurably on either side of that range. An optimum transmission would permit the engine to operate within that range regardless of the load on the engine. The engine driven primary clutch is therefore mounted to the power source and maintains the engine rpm at a value where the most power is being produced by the engine. The primary clutch also controls the engagement and disengagement of the engine from the load (the track in the case of a snowmobile) in order to start and stop vehicle movement. The secondary clutch is attached to the load (through the output shaft, gears, and track) and changes the ratio of the two clutches as the load varies. This function is performed by the torque sensing cam that can be considered the heart of the secondary clutch.

As a conventional torque sensing driven clutch upshifts to a higher ratio, the movable sheave opens the spacing between it and the fixed sheave and simultaneously rotates backwards against rotation of the fixed sheave. This backwards rotation is caused by the cam angle in the cam that is attached to the stationary sheave or the output shaft. This rotational movement on the upshift makes the clutch open to a smaller diameter, thus making a higher ratio. However, this backward rotation of the movable sheave also causes belt slippage on the movable sheave, because the sheave is trying to rotate the same direction as the stationary sheave due to the direction that the V-belt is being pulled. The only force keeping the sheaves from opening against the track load is a spring compression force and a torsional force as the clutch opens to a higher ratio. The compression force and torsional twist in the spring keeps the side load on the V-belt, which is being squeezed between the two pulleys. Again, the V-belt is slipping on the movable sheave, and the driving force is being applied to the fix sheave.

In the backshift mode, the clutch is in an open position, and the V-belt must be pushed toward the top of the pulley, thus a larger diameter, to obtain a lower ratio. The load on the track against the forward rotation makes the cam apply a closing force to the movable sheave along with the compression of the spring and the torsional unwinding of the spring. In addition, the movable sheave is being pulled rotationally forward by the V-belt. The V-belt slips rotationally on the sheaves as it moves to a larger diameter of the backshift pulley position. Again, this opposite rotation of the sheaves causes the slippage of the V-belt during the upshift and backshift function of the clutch.

Therefore, in a conventional clutch, the V-belt is working with two different pulling loads. As the movable sheave opens against the pulling force of the V-belt, the V-belt slips along the movable sheave, and all the force is transferred to the portion of the V-belt that is driving the stationary sheave. Because of this slipping, friction causes heat to build in the clutches, which makes them much less efficient and causes the clutch to operate less efficiently.

BRIEF SUMMARY OF THE INVENTION

The invention is an improved torque sensitive clutch that comprises an outer sheave and inner sheave and a means of locking the rotation of the outer sheave and inner sheave such that they do not rotate relative to each other. It further comprises a means for transmitting essentially all of the rotational forces from the outer sheave and inner sheave to a vehicle's drive train shaft.

DETAILED DESCRIPTION

Figure 1:
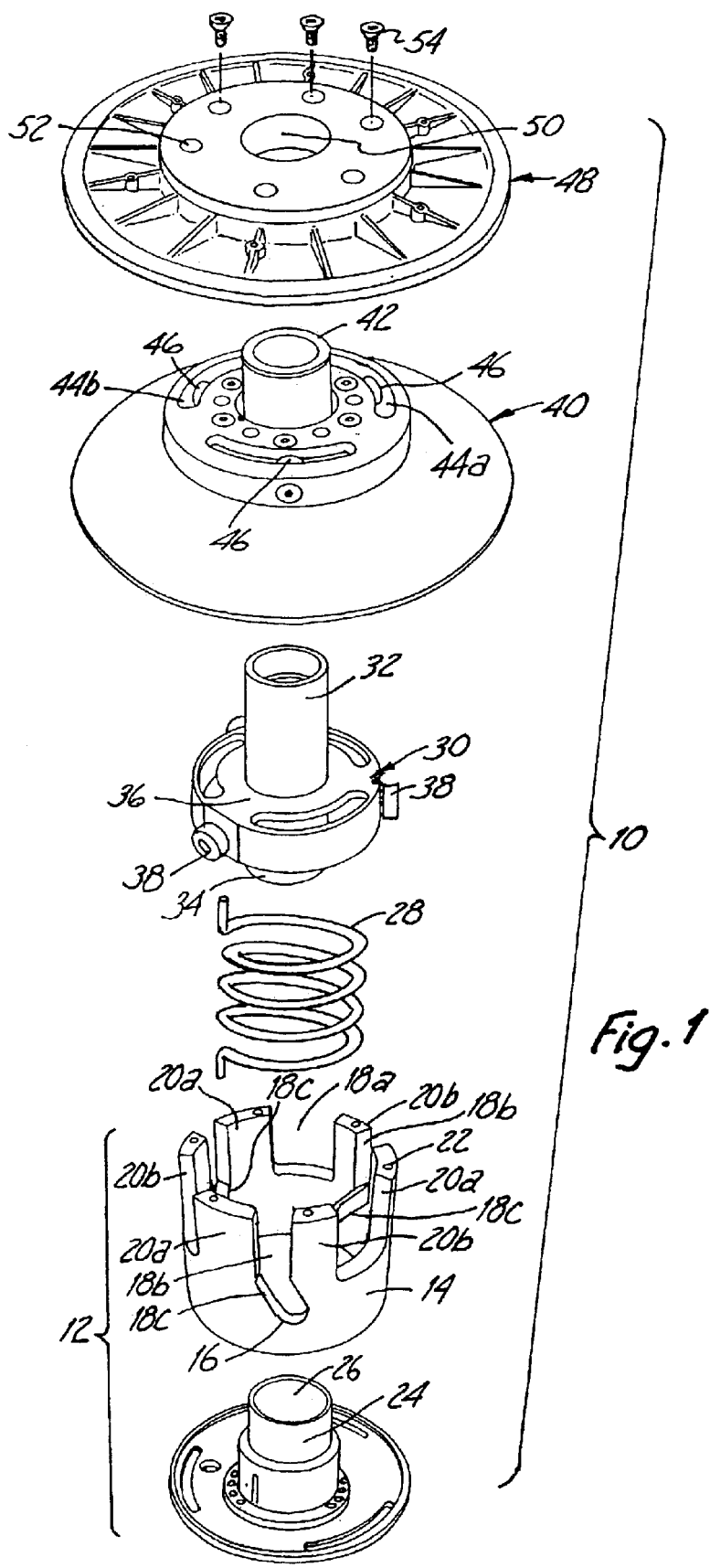
FIG. 1 is an exploded view of the preferred embodiment of the clutch system.

FIG. 1 is an exploded view of the preferred embodiment of clutch system 10 as used for a secondary clutch for a snowmobile. However, clutch system 10 may also be used as the primary clutch and in other similar vehicles such as all terrain vehicles.

Clutch system 10 includes cam assembly 12 with cam 14 having sleeve 16, slots 18a, 18b and 18c, towers 20a and 20b with tower bores 22, shaft housing 24 and shaft opening 26; spring 28; power shaft assembly 30 with upper shaft 32, lower shaft 34, flange 36 and cam rollers 38; outer sheave 40 with bushing 42, tower openings 44a and 44b and sheave rollers 46; inner sheave 48 with central opening 50 and tower bores 52; and fasteners 54.

The lower portion of cam 14 is sleeve 16, and the upper portion comprises towers 20a and 20b. The wider towers are designated 20a, while the smaller towers are designated 20b. Towers 20a and 20b extend from sleeve 16 and alternate along the circumference of sleeve 16. Tower bores 22 are located at the top of each tower 20a and 20b. Slots 18a and 18b are defined by the placement of towers 20a and 20b-slot 18a being wider than slot 18b. The distance between tower 20a and tower 20b to the left of tower 20a is longer than the distance between tower 20a and tower 20b to right of tower 20a. Slot 18c is an angled slot that extends from slot 18b into sleeve 16. Shaft housing 20 is centered within cam 14 around shaft opening 26.

Spring 28 has a diameter large enough to fit over shaft housing 20 of cam assembly 12. Spring 28 is placed over shaft housing 20.

Flange 36 of power shaft assembly 30 defines upper shaft 32 and lower shaft 34. Cam rollers 38 are attached equidistantly around the circumference of flange 36.

Power shaft assembly 30 is mounted coaxially onto cam assembly 12. Lower shaft 34 extends through shaft housing 20 into shaft opening 26. Cam rollers 38 movably engage slots 18c. Spring 28 has a length such that it is compressed between cam assembly 12 and power shaft assembly 30.

Bushing 42 is centered within outer sheave 40. Tower openings 44a and 44b circumferentially surround bushing 42, and sheave rollers 46 are mounted off-center to define tower openings 44a and 44b.

Outer sheave 40 is coaxially mounted onto power shaft assembly 30 and cam assembly 12 such that upper shaft 32 extends through bushing 42, and towers 20a and 20b extend through tower openings 44a and 44b, respectively. Sheave rollers 46 engage slots 18b to allow outer sheave 40 to move axially relative to cam assembly 12.

Central opening 50 is centered on inner sheave 48. Bores 52 circumferentially surround central opening 50. Inner sheave 48 is coaxially assembled onto outer sheave 40 such that bushing 42 extends through central opening 50, and bores 52 align with tower bores 22.

Fasteners 54 secure inner sheave 48 to cam assembly 12. Thus, inner sheave 48 is fixed relative to cam assembly 12, while outer sheave 40 moves axially relative to cam assembly 12 and inner sheave 48.

In operation, lower shaft 34 is attached to a drive train shaft of a vehicle via a spline or key shaft or other means of locking lower shaft 34 onto the drive train shaft. Lower shaft 34 engages cam assembly 12 and inner sheave 48 but is removable from them. This allows clutch system 10 to be removably attached to a vehicle's drive train shaft via lower shaft 34. Any type of drive train shaft can be used with clutch system 10 simply by removing power shaft assembly 30 and changing it out for one that fits any style drive train shaft.

As the vehicle's motor drives the V-belt between sheaves 40 and 48, the rotating force is transmitted to cam assembly 12, because inner sheave 48 is locked into cam assembly 12. Cam rollers 38 of power shaft assembly 30 are engaged with slots 18c so that the rotating force is transmitted to power shaft assembly 30. Slots 18b and 18c are preferably encapsulated, which keeps clutch system 10 torque sensitive. With flange 36 attached to cam 14 via cam rollers 38, and cam 14 attached directly to inner sheave 48 and indirectly, via sheave rollers 46, to outer sheave 40, outer sheave 40 and inner sheave 48 are locked into power shaft assembly 30. As seen in FIG. 1, this embodiment of clutch system 10 is oriented in the opposite (mirror image-like) direction from previous clutches. Therefore, slots 18c are angled opposite and spring 28 is coiled opposite of previous clutches.

As clutch system 10 upshifts to a higher ratio, the spacing between sheaves 40 and 48 expands, and as it expands, sheaves 40 and 48 rotate backward against the rotation of the motor without rotating relative to each other. As clutch system 10 backshifts, the spacing between sheaves 40 and 48 contracts. Spring 28 acts as a bias to contract the spacing, and sheaves 40 and 48 rotate forward without rotating relative to each other. Since sheaves 40 and 48 do not rotate relative to each other, the V-belt riding between them does not slip and results in total torque transfer through cam 14 to power shaft assembly 30. Cam 14 senses the total load applied to it and selects the proper ratio to upshift or backshift to meet the varying load conditions. Therefore, in addition to the load from the motor, the resistance to turn from the track, in the case of a snowmobile, drives through cam 14 and cam rollers 38. Besides allowing the spacing between sheaves 40 and 48 to expand and contract without rotating relative to each other, clutch system 10 also increases the force from cam 14 that is applied to sheaves 40 and 48, increases the sensitivity of the load that is being applied from the track and the motor and increases the efficiency of clutch system 10 to transmit power to the final drive system.

Clutch system 10 allows for clutch bearings with a larger diameter and longer length for more surface area. The clutch bearings may have a diameter of about 1.75 in. to 2.5 in. and a length of about 4.0 in. to 6.0 in. This provides for better movement of sheaves 40 and 48 on the shaft and better side load support. As the spacing between sheaves 40 and 48 widens, a large side load is exerted. With more surface area on the bearings, the load is spread over a larger area to reduce the force per unit area on the bearings.

Preferably, the bearings are tapered roller bearings. These bearings are adjustable so that, for example, outer sheave 40 does not wobble. Also, after extensive use, outer sheave 40 may begin to wobble from wear. The tapered roller bearings need only be adjusted to accommodate for that wear.

The design of clutch system 10 allows it to operate with a larger selection of cam angles (slot 18c). Prior art cams have limited rotation. Cam 14 of clutch system 10 can rotate 360° to align with power shaft assembly 30 allowing cam angles of about 20° to about 90°.

Another benefit of the present invention is that one sheave mold may be used for both outer sheave 40 and inner sheave 48. Simple machining to the generic sheave is done to produce sheaves 40 and 48. This benefit saves on manufacturing costs.

Figure 2:
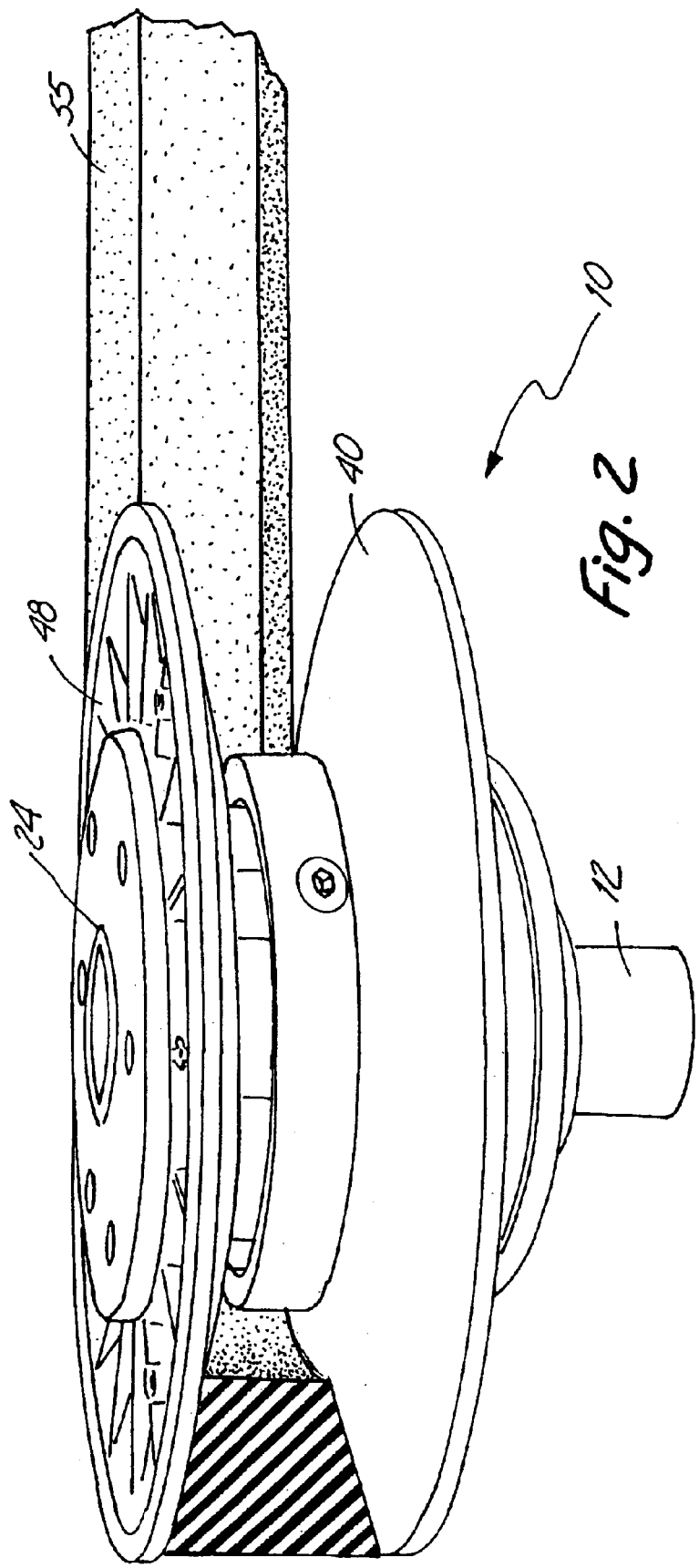
FIG. 2 is a perspective view of the preferred embodiment of the present invention.

FIG. 2 shows clutch system 10 of the present invention assembled. FIG. 2 shows cam assembly 12, outer sheave 40, inner sheave 48, shaft housing 24 and belt 55 (shown in phantom).

Figure 3:
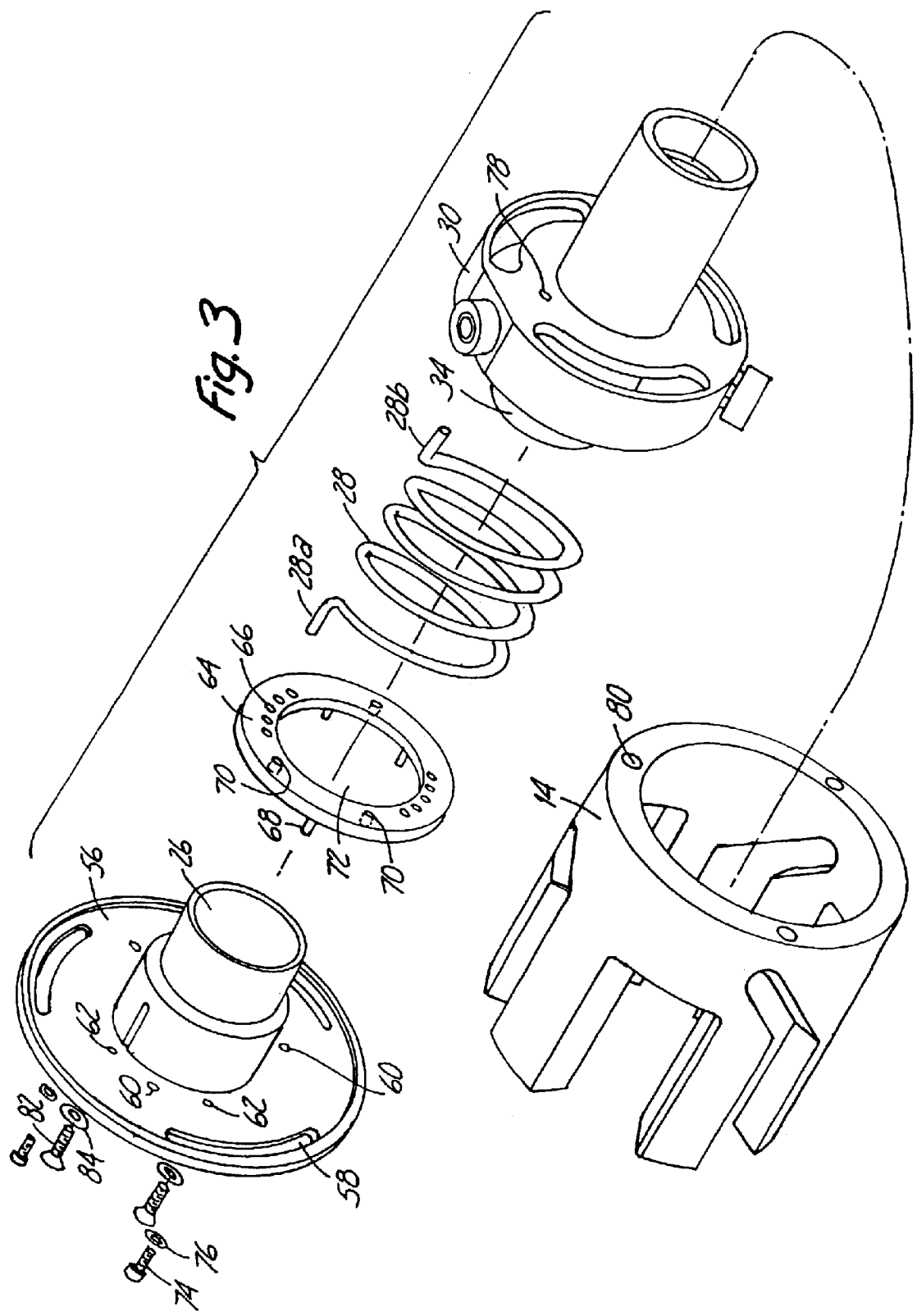
FIG. 3 is an exploded view of the spring adjustment mechanism.

FIG. 3 is an exploded view of the spring adjustment mechanism. FIG. 3 includes lid 56 with shaft opening 26, arcuate openings 58, pin bores 60 and screw bores 62; spring plate 64 with spring bores 66, pins 68, screw mounts 70 and spring plate opening 72; screws 74; nuts 76; spring 28 with spring tabs 28a and 28b; power shaft assembly 30 with lower shaft 34 and spring bore 78; cam 14 with lid attachment bores 80; fasteners 82; and washers 84.

Screw mounts 70 on spring plate 64 are aligned with screw bores 62 of lid 56. Screws 74 and nuts 76 secure spring plate 64 relative to lid 56 by extending through screw bores 62 and into screw mounts 70. Pins 68 align with and extend through pin bores 60 for support. Spring tab 28a extends into one of spring bores 66 and spring tab 28b extends into spring bore 78 of power shaft assembly 30. Lower shaft 34 of power shaft assembly 30 extends through spring plate opening 72 and shaft opening 26. Lid attachment bores 80 of cam 14 align with arcuate openings 58 of lid 56, and fasteners 82 with washers 84 secure cam 14 to lid 56 via lid attachment bores 80.

To adjust the compression of spring 28, screws 74 are adjusted either further into or out of lid 56 to either increase or decrease compression, respectively, of spring 28. Nuts 76 are screwed onto screws 74 to secure screws 74 in place.

To adjust the torsional twist of spring 28, screws 74 are loosened such that lid 56 rotates with fasteners 74 sliding within arcuate openings 58. As lid 56 rotates, spring plate 64 also rotates and either increases or decreases the torsional twist of spring 28 depending on the direction of rotation of lid 56.

The spring adjustment mechanism for clutch system 10 is an improvement over prior art clutches, because it is all done from outside clutch system 10. Clutch system 10 does not need to be taken apart in order to adjust spring 28, which is especially useful for quick tune-ups out in the "field."

In addition, the design of clutch system 10 allows cam 14 to function over a wider range of engine horsepower and torque ratings, because all the torque is transmitted through cam 14, which can operate with higher cam angles. Thus, only spring 28 needs to be adjusted, as described above, when clutch system 10 is installed into a different engine.

Figure 4:
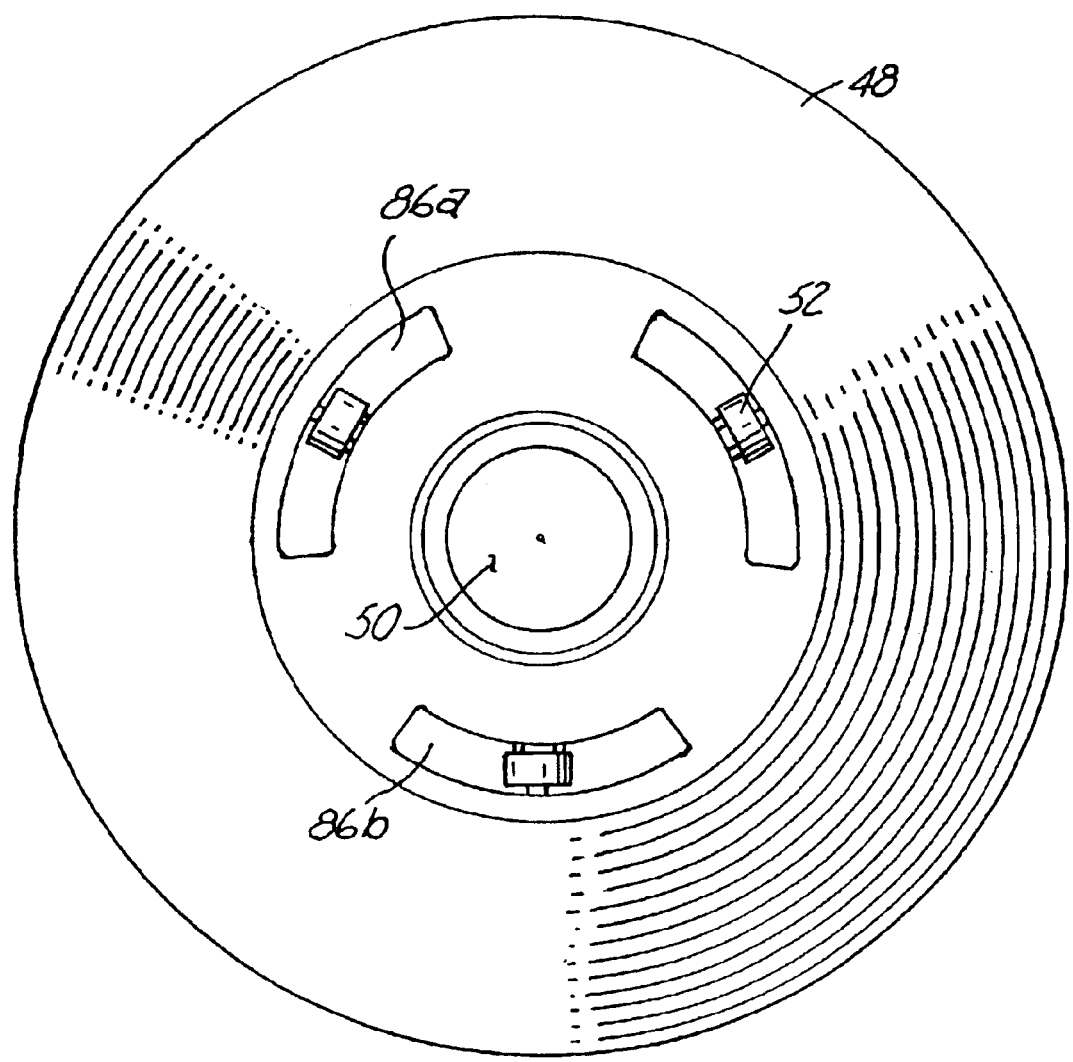
FIG. 4 is an elevated view of the bottom of the inner sheave of the clutch system.

FIG. 4 shows how towers 20a and 20b are positioned on inner sheave 48. Inner sheave 48 includes central opening 50, bores 52 and tower mounts 86a and 86b. Tower mounts 86a and 86b are recesses that circumferentially surround central opening 50 and are spaced to align with towers 20a and 20b, respectively. Bores 52 are drilled through each of tower mounts 86a and 86b.

When clutch system 10 is assembled, towers 20a and 20b engage tower mounts 86a and 86b, respectively. Fasteners 54 (FIG. 2) extend through bores 52 to secure inner sheave 48 to cam 14. During operation, a torsional twist is exerted on cam 14, which, with the present invention, is supported by inner sheave 48 as well as fasteners 54. This provides a stronger and more positive positioning of cam 14 to power shaft assembly 30.

Figure 5:
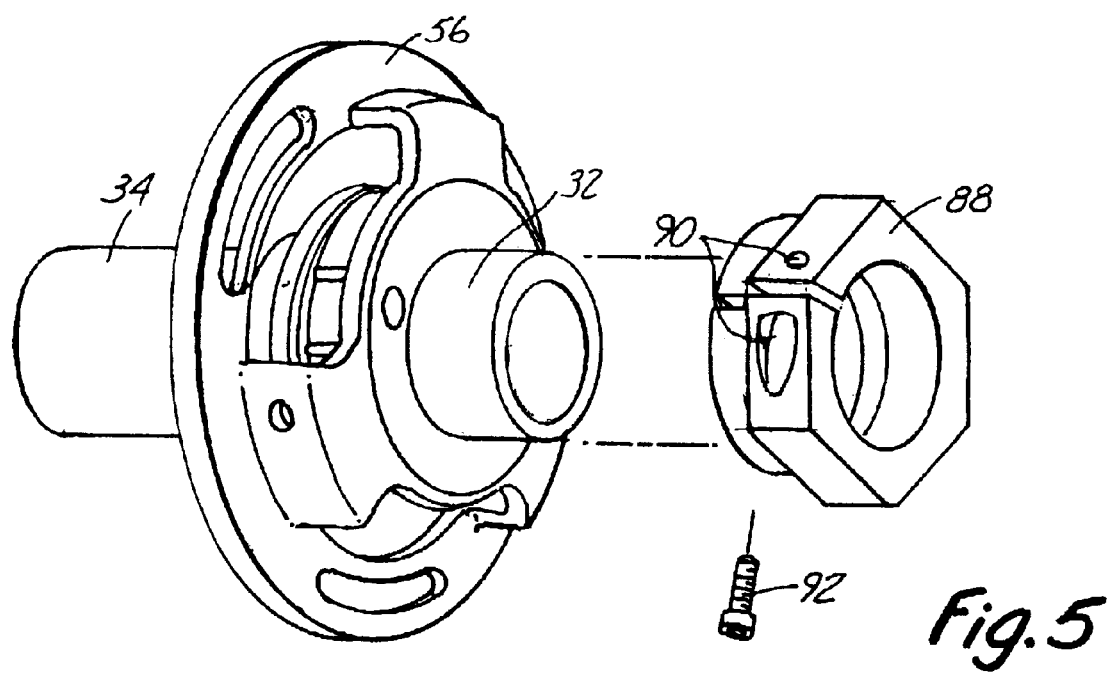
FIG. 5 is an exploded view of the V-belt wear adjustment mechanism.

FIG. 5 is an exploded view of the V-belt wear adjustment mechanism. FIG. 5 shows upper shaft 32, lower shaft 34, lid 56, c-ring 88 with threaded bore 90 and screw 92. C-ring 88 fits around lower shaft 34, and screw 92 is screwed into threaded bore 90 to tighten c-ring 88 and secure it in place around lower shaft 34.

After extensive operation of clutch system 10, the V-belt which rides between sheaves 40 and 48 begins to wear. In order to provide optimum performance, clutch system 10 must be adjusted to accommodate V-belt wear by decreasing the spacing between sheaves 40 and 48. With the present invention, this is accomplished by removing screw 92 from threaded bore 90 and repositioning c-ring 88 further down along lower shaft 34 such that a smaller portion of lower shaft 34 extends through lid 56. Screw 92 is then screwed into threaded bore 90 to secure c-ring 88 in place. Repositioning c-ring 88 in this manner decreases the spacing between sheaves 40 and 48 to accommodate any wear to the V-belt and is performed with minimal disassembly of clutch system 10.

Current belt wear adjusters are anchored to the transmission shaft, making the adjust very critical because any movement in the clutch changes the position of the belt. In the present invention, movement in clutch assembly 10 does not effect the adjustment, because it floats in and out as it is mounted on power shaft assembly 30.

Figure 6:
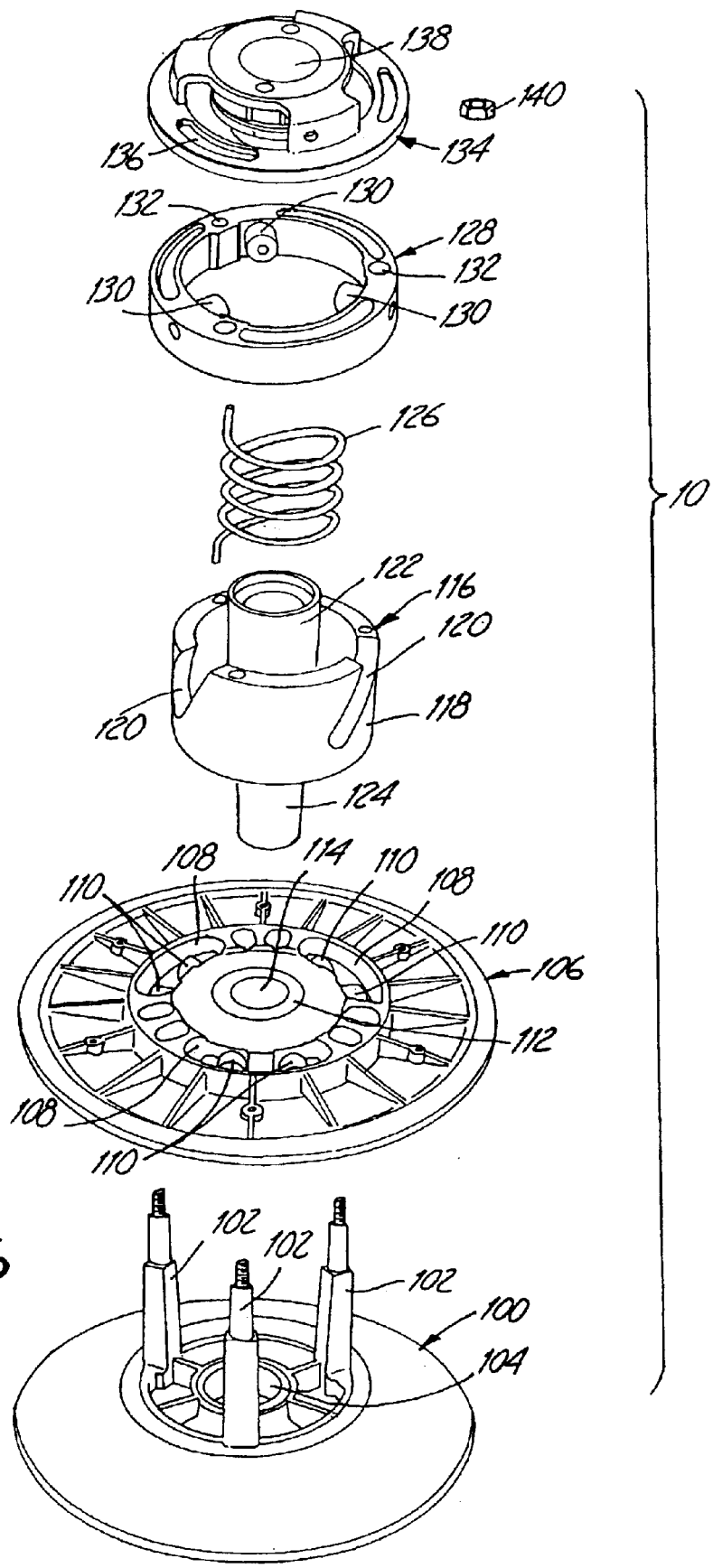
FIG. 6 is an exploded view of the alternative embodiment of the clutch system.

A second embodiment of clutch system 10 is shown in FIG. 6. FIG. 6 includes inner sheave 100 with towers 102 and central opening 104; outer sheave 106 with arcuate openings 108, sheave rollers 110, bushing 112 and shaft opening 114; power shaft assembly 116 with cam 118, slots 120, upper shaft 122 and lower shaft 124; spring 126; torque ring assembly 128 with cam rollers 130 and tower bores 132; lid 134 with arcuate openings 136; and nuts 138.

Central opening 104 is centered within inner sheave 100, and towers 102 circumferentially surround central opening 104. Shaft opening 114 is centered within outer sheave 106 with bushing 112 within shaft opening 114. Arcuate openings 108 circumferentially surround shaft opening 114, and pairs of sheave rollers 110 are positioned within each of arcuate openings 108.

Outer sheave 106 is mounted onto inner sheave 100. Towers 102 extend through arcuate openings 108 between sheave rollers 110. Bushing 112 extends through central opening 104 of inner sheave 100.

Cam 118 of power shaft assembly 116 defines upper shaft 122 and lower shaft 124. Slots 120 are formed in cam 114 at an angle (cam angle).

Power shaft assembly 116 is mounted onto outer sheave 106. Lower shaft 124 extends through bushing 112 and shaft opening 114 such that cam 118 is essentially perpendicular to outer sheave 106.

Spring 126 has a diameter such that it will fit over upper shaft 122. Spring 126 is positioned over upper shaft 122.

Torque ring assembly 128 has a substantially circular shape. Cam rollers 130 are equivalently spaced around the inside of torque ring assembly 128. Tower bores 132 are also equivalently spaced around torque ring assembly 128.

Torque ring assembly 128 is mounted onto towers 102 of inner sheave 100. Tower bores 132 align with towers 102, and cam rollers 130 engage slots 120 of cam 118. Cam rollers 130 are movable within slots 120.

Central opening 138 is centered on lid 134. Arcuate openings 136 are spaced circumferentially around central opening 138.

Lid 134 is mounted over torque ring assembly 128 such that towers 102 extend through arcuate openings 136. Upper shaft 122 extends through central opening 138.

Nuts 140 are secured to the top of towers 102, which are threaded. Spring 126 has a length such that it is compressed between lid 134 and power shaft assembly 116 when assembled.

In operation, the spacing between sheaves 100 and 106 also expands and contracts without sheaves 100 and 106 rotating relative to each other. The rotation of sheaves 100 and 106 are locked together by the encapsulation of towers 102 between sheave rollers 110. The V-belt rides up and down the face of sheaves 100 and 106 to create a variable ratio without the V-belt slipping. Thus, as with the previous embodiment, all the rotational forces are transmitted through cam 118.

All the rotational forces are then transmitted to shafts 122 and 124 through torque ring assembly 128. As described above, cam rollers 130 ride in slots 120, which are preferably encapsulated to maintain torque sensitivity of clutch system 10 through upshifting and backshifting.

Power shaft assembly 116 is not connected to sheaves 100 and 106. Therefore, power shaft assembly 116 is removable from clutch system 10 and can be replaced to fit any style of drive train shaft.

Figure 7:
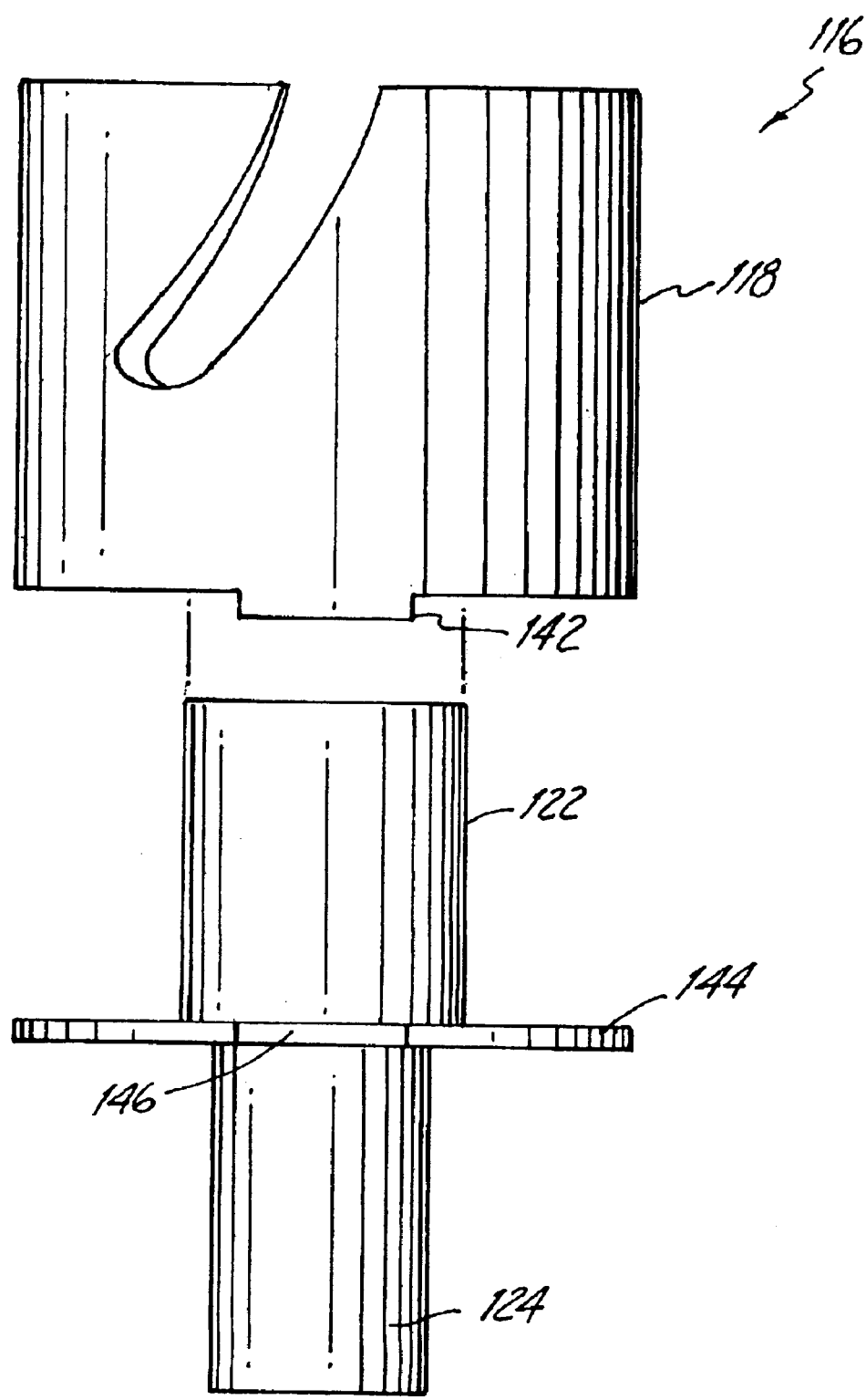
FIG. 7 is an exploded, side elevation view of the power shaft assembly of the alternative embodiment of the clutch system.

In this embodiment, the stronger and more positive positioning of cam 118 to power shaft assembly 116 is illustrated in FIG. 7. FIG. 7 is an exploded view of power shaft assembly 116. Power shaft assembly 116 includes cam 118 with raised notch 142, upper shaft 122, lower shaft 124 and flange 144 with recessed notch 146.

Raised notch 142 aligns and is sized to fit into recessed notch 146 when cam 118 is attached to flange 144. Only one set of notches is shown in FIG. 7, but there is preferably a plurality of sets of notches spaced around cam 118 and flange 144. This design increases the strength of the positioning of cam 118 against the torsional force applied to cam 118 by cam rollers 130.

The spring adjustment and V-belt wear mechanisms are carried out essentially the same as described for the previous embodiment. In addition, the highlighted features of the previous embodiment of clutch system 10 are also found in the second embodiment.

Although the present invention has been described with reference to preferred embodiments, workers skilled in the art will recognize that changes may be made in form and detail without departing from the spirit and scope of the invention.

What is claimed is:

1. A variable ratio torque sensitive clutch for connection to a drive train shaft of a vehicle, the clutch comprising:
   an outer sheave and inner sheave which are coaxial and are relatively movable in an axial direction as a function of shifting of the clutch;
   means for locking rotation of the outer sheave and inner sheave to each other such that the outer sheave and inner sheave do not rotate relative to each other, the means for locking having at least one tower and at least one roller; and
   means for transmitting rotational forces from the outer sheave and inner sheave to a vehicle's drive train shaft, wherein substantially all rotational forces are transmitted through the means for transmitting.

2. The clutch of claim 1 wherein the means for locking further comprises:
   at least one pair of towers on the means for transmitting; and
   at least one roller on the outer sheave, the roller being encapsulated between the pair of towers.

3. The clutch of claim 1 wherein the means for locking further comprises:
   at least one tower on the inner sheave; and
   at least one pair of sheave rollers on the outer sheave, wherein the tower is encapsulated between the pair of sheave rollers.

4. The clutch of claim 1 wherein the means for transmitting further comprises:
   a power shaft assembly having at least one roller; and
   a cam assembly having at least one slot with a cam angle, wherein the roller movably engages the slot.

5. The clutch of claim 4 wherein the slot is encapsulated.

6. The clutch of claim 1 wherein the means for transmitting further comprises:
   a power shaft assembly having a cam, the cam having at least one slot with a cam angle; and
   a torque ring assembly having at least one roller, the roller movably engaging the slot.

7. The clutch of claim 6 wherein the slot is encapsulated.

8. The clutch of claim 1 and further comprising:
   a spring;
   means for adjusting compression of the spring, the means for adjusting being on an external side of the clutch; and
   means for adjusting torsional twist of the spring, the means for adjusting being on an external side of the clutch.

9. The clutch of claim 1 and further comprising:
   means for adjusting spacing between the outer sheave and inner sheave, the means for adjusting being on an external side of the clutch.

10. The clutch of claim 1 wherein the means for transmitting further comprises:
    a power shaft assembly that is connectable to a drive train shaft of a vehicle, the power shaft assembly being selectable to operate with one of a plurality of drive train shafts.

11. The clutch of claim 1 wherein the means for transmitting further comprises:
    a cam having at least one slot, the slot having cam angles of about 20° to about 90°.

12. The clutch of claim 2 and further comprising:
    at least one pair of tower mounts on the inner sheave for receiving the pair of towers.

13. The clutch of claim 6 wherein the power shaft assembly further comprises:
    a flange having at least one recessed notch, wherein the cam has at least one raised notch that engages the recessed notch.

14. The clutch of claim 1 wherein the outer sheave and inner sheave are manufactured from a single mold.

15. The clutch of claim 1 wherein the means for transmitting further comprises:
    clutch bearings having a diameter of about 1.75 in. to about 2.5 in. and a length of about 4.0 in. to about 6.0 in., the bearings being adjustable such that the outer sheave does not wobble and to accommodate for wear.

16. A clutch assembly for mounting on a drive train shaft of an engine, the clutch assembly comprising:
    a power shaft assembly for attaching the clutch assembly to the drive train shaft;
    sheaves connected to each other and having a spacing between the sheaves that changes, the sheaves coaxially mounted to and freely rotatable around the power shaft assembly;
    at least one tower and at least one roller to lock the sheaves such that the sheaves have rotational force but do not rotate relative to each other around the power shaft assembly; and
    means for transmitting essentially all rotational forces from the sheaves to the power shaft assembly.

17. The clutch assembly of claim 16 and further comprising:

a bias means for providing a bias which acts to contract spacing between the sheaves; and means for adjusting compression and torsional twist of the bias means on an external side of the clutch assembly.

18. The clutch assembly of claim 16 wherein the means for transmitting further comprises:

a shaft on the power shaft assembly; and a cam which can rotate about 360° to align with the shaft.

19. A clutch assembly for a belt driven vehicle, the clutch assembly comprising:

an outer sheave and inner sheave, the outer sheave and inner sheave being rotatable about a common axis but do not rotate relative to each other;

a cam engaging the inner sheave, the cam having at least one angled slot;

at least one pair of towers on the cam, the towers encapsulating at least one first roller on the outer sheave to prevent the relative rotation between the inner and outer sheaves; and a power shaft assembly having at least one second roller movably engaged with the slot such that the cam and roller maintain torque sensitivity of the clutch assembly and transmit essentially all rotational forces of upshifting and backshifting to the power shaft assembly.

20. A clutch assembly for a belt driven vehicle, the clutch assembly comprising:

an outer sheave having at least one pair of rollers, and an inner sheave having at least one tower encapsulated by the rollers, the outer sheave and inner sheave having rotational force but do not rotate relative to each other;

a torque ring engaging the inner sheave; and a cam movably engaging the torque ring, the cam and torque ring maintaining torque sensitivity of the clutch assembly and transmitting essentially all rotational forces of upshifting and backshifting to a power shaft assembly of the clutch assembly.

* * * * *